(12) United States Patent
Oue et al.

(10) Patent No.: US 6,993,157 B1
(45) Date of Patent: Jan. 31, 2006

(54) DYNAMIC IMAGE PROCESSING METHOD AND DEVICE AND MEDIUM

(75) Inventors: Yasuhiro Oue, Moriguchi (JP); Kazuhide Sugimoto, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/719,374

(22) PCT Filed: May 18, 2000

(86) PCT No.: PCT/JP00/03179

§ 371 (c)(1),
(2), (4) Date: Dec. 8, 2000

(87) PCT Pub. No.: WO00/70558

PCT Pub. Date: Nov. 23, 2000

(30) Foreign Application Priority Data

| May 18, 1999 | (JP) | ................................. 11-137410 |
| May 18, 1999 | (JP) | ................................. 11-137411 |
| Mar. 14, 2000 | (JP) | ............................ 2000-071340 |
| Mar. 30, 2000 | (JP) | ............................ 2000-095825 |

(51) Int. Cl.
*G06K 9/00* (2006.01)

(52) U.S. Cl. ...................... 382/103; 382/203; 348/169; 348/208.14; 715/863

(58) Field of Classification Search .............. 382/103, 382/104, 107, 100, 169, 170, 171, 173, 181, 382/203; 348/169–172, 208.14; 715/863; 345/156–184; 713/150, 186
See application file for complete search history.

(56) References Cited

U.S. PATENT DOCUMENTS 5,642,166 A * 6/1997 Shin et al. ............. 375/240.15
5,719,947 A  2/1998 Enomoto et al.
6,256,400 B1 * 7/2001 Takata et al. ................ 382/103
6,421,453 B1 * 7/2002 Kanevsky et al. .......... 382/115

(Continued)

FOREIGN PATENT DOCUMENTS

EP  0613097  8/1994

(Continued)

OTHER PUBLICATIONS

Barnard, et al., "Disparity Analysis of Images." *IEEE Transactions on Pattern Analysis and Machine Intellighence.* vol. PAMI-2, No. 4, Jul. 1980. pp. 333-340.

*Primary Examiner*—Samir Ahmed
*Assistant Examiner*—Anand Bhatnagar
(74) *Attorney, Agent, or Firm*—Pillsbury Winthrop Shaw Pittman LLP

(57) ABSTRACT

A motion image processing method and device for authenticating a user using a specific device, using motion information of an object. Time series monochrome images, obtained by photographing an object, using a camera, are input. An object is detected from an initial frame of the input time series images, using a basic shape characteristic, and a plurality of reference points to be tracked are automatically determined in the object. Then, corresponding points of the respective reference points are detected in an image frame other than the initial frame among the input time series images. Subsequently, motion information of a finger is calculated, based on the result of tracking the respective reference points and an assumption of limited motion in a 3D plane. Based on the calculated motion parameter, a solid object is subjected to coordinate conversion, and displayed if necessary. As a result of the tracking, a reference point in each frame is updated. Tracking, motion parameter calculation, and displaying are repeated with respect to subsequent frames.

13 Claims, 17 Drawing Sheets

U.S. PATENT DOCUMENTS

| | | | |
|---|---|---|---|
| 6,654,483 B1 * | 11/2003 | Bradski | 382/107 |
| 6,714,201 B1 * | 3/2004 | Grinstein et al. | 345/474 |
| 2003/0071715 A1 * | 4/2003 | Lavelle et al. | 340/5.5 |

FOREIGN PATENT DOCUMENTS

| | | |
|---|---|---|
| JP | 05012443 | 1/1993 |
| JP | 05197809 | 8/1993 |
| JP | 06089342 | 3/1994 |
| JP | 06309462 | 11/1994 |
| JP | 07057103 | 3/1995 |
| JP | 08263666 | 10/1996 |
| JP | 10222241 | 8/1998 |
| JP | 11023293 | 1/1999 |
| KR | EP 0 720 377 A2 * | 7/1996 |

* cited by examiner

DYNAMIC IMAGE PROCESSING METHOD AND DEVICE AND MEDIUM

This application is the national phase of international application PCT/JP00/03179 filed 18 May 2000 which designated the U.S. and was not published under PCT Article 21(2) in English.

TECHNICAL FIELD

The present invention relates to a motion image processing method and device, and to a medium, and in particular to a characteristic extraction technique based on basic shape characteristics, to a motion image processing method and device in which motion information of an object is calculated while tracking the characteristic point in an image, and to a medium.

BACKGROUND ART

Conventional motion image processing methods and devices, in which characteristics are extracted from time series images obtained by photographing an object in motion and motion information of the object is estimated based on the extracted characteristics, include one method disclosed in Japanese Patent Laid-open Publication No. Hei 6-89342, in which a marker is attached to a finger tip, and another method, in which a glove in a particular color is worn.

Further, as a motion image estimation method, there is available a method in which a magnetic sensor-equipped data glove and so on is worn on a hand, rather than capturing an object image.

Meanwhile, when a conventional technique is applied to a specific device, for example, application to an authentication system when using an automobile, a key equipped with a magnetic sensor, and so on, is necessary.

The above mentioned motion image processing methods and devices have problems as described below.

(1) A method using a marker attached on a finger tip requires marker identification and information on positional relationship among markers.

(2) It is difficult to apply a method using a glove in a particular color to a background containing the same color as that of the glove or to an image expressed in monochrome tones.

(3) A method using a data glove and so on imposes a burden on an operator.

As a technique for tracking an object in time series images to extract motion information thereof, one available technique identifies an image pattern similar to an image pattern of an object, in adjacent image frames by means of correlation matching, so that the motion is extracted as motion of the object (Japanese Patent Laid-open Publication No. Hei 5-197809).

This, however, has a problem such that rotation or size change of an object may result in a change of an image pattern appearing in an image frame, and matching and thus object tracking cannot be achieved properly.

As other methods, techniques (Japanese Patent Laid-open Publications No. Hei 5-12443, No. Hei 8-263666) for tracking a contour of an object, using an energy minimizing method, to extract motion of an object from the obtained contour, are available.

Although these methods can handle object rotation or size change, they cannot handle such a large motion of an object that areas occupied by an object do not overlap between adjacent image frames because the contour in a preceding image frame is used as an initial value in solving an energy minimizing problem.

Other techniques are also available, in which a reference point is set in an area with an object in the initial screen, and the reference point is tracked among adjacent image frames (S. T. Barnard, et al.: "Disparity Analysis of Images, IEEE Transactions on Pattern Analysis and Machine Intelligence", Vol. PAMI-2, No. 4, July 1980). According to this technique, to track a reference point, candidates for a corresponding point of each reference point are determined through correlation matching using an image pattern in a small area around the reference point, and a corresponding point is then determined among the candidates in consideration of consistency as a whole. This can handle object rotation and size change because a local characteristic of an object is used for tracking.

This can also handle an object with such a large motion that areas occupied by an object do not overlap between adjacent image frames.

In the above conventional techniques, in which object tracking is made based on correspondence of reference points in adjacent image frames, how to determine a reference point is an important matter.

A distinctively characteristic point, such as an angle, may often be used as a reference point in such conventional techniques. Use of such a reference point makes it to obtain a point corresponding to a reference point in adjacent image frames, using, for example, an image pattern in a small area around the reference point.

Although a distinctively characteristic point, such as an angle, is effectively used as a reference point, as described above, the number of such points is limited. Therefore, the upper limit of the number of reference points depends on the shape of an object.

Also, should a focused reference point disappear from the image due to being hidden or for other reasons, the reference point is no longer trackable.

In addition, the shape of an object is limited as these methods cannot handle an object with a free-hand contour or a distinctive feature (such as an angle).

The present invention has been conceived to overcome the above described conventional problems, and aims to provide a motion image processing method, device, and medium for allowing stable tracking of any motion of an object in any shape. The present invention also aims to provide a motion image processing method, device, and medium for calculating motion information of a finger tip, and so on, which draws a pattern in air, adapted to be applied to user authorization when a user attempts to use a specific device (e.g., an automobile).

DISCLOSURE OF INVENTION

In order to achieve the above object, according to the present invention, there is provided a motion image processing method for authenticating a user when the user uses a specific device, using motion information of an object obtained from a plurality of time series frames.

Here, preferably, calculation of the motion information of the object comprises a first step of extracting contour shape characteristic of an object contained in time series images by processing a frame of the time series images; a second step of detecting a reference point in the frame, using the shape characteristic; and a third step of tracking the reference point over time to calculate the motion information of the object in a 3D space.

According to the present invention, there is also provided a motion image processing method for tracking motion of an object contained in time series images, using a contour shape characteristic. This method comprises a first step of extracting a shape characteristic by processing a frame of the time series images; a second step of detecting a reference point in the frame, using the shape characteristic; a third step of tracking the reference point over time to calculate the motion information of the object in a 3D space; and a fourth step of modifying a display object provided beforehand, based on the motion information.

Here, preferably, the first step includes the steps of extracting a contour based on edge information of an input image of the object, detecting characteristic points including a bending point, which is a point with a quick change of an edge gradient direction based on edge information, a curving point, which is a point on a contour with inversion of a curvature sign and a moderate change of an edge gradient direction, and a transition point, which is a point on a contour with a change of a curvature from zero to another value, or vice versa, and a moderate change of an edge gradient direction, dividing the contour into a straight line segment and a concave or convex curve segment based on a characteristic point, and combining segments obtained in a same frame, whereby a specific portion is detected in the image obtained by projecting the object.

Further, preferably, a reference point for tracking is determined on a contour of the specific portion detected in the image obtained by projecting the object.

Still further, preferably, shape characteristic of a contour of the object is expressed using a plurality of segments defined by characteristic points, and a reference point for tracking a corresponding point is determined on the segment.

Yet further, preferably, at least four or more points on a same plane in a 3D space are selected, as a reference point for tracking the corresponding point, in an image in an initial frame, and a corresponding point corresponding to each of the reference points is detected in a frame different in time from the initial frame to be tracked.

Motion information of the plane in a 3D space is calculated, based on the plurality of reference points for tracking and corresponding points obtained in a plurality of time series frames, and also on limited motion assumption for a plane in a 3D space such that pairs of reference points and corresponding points are located on a same plane in a 3D space, and a model and a pointer provided beforehand can be modified based on the motion information calculated.

According to the motion image processing method of the present invention, the user of a specific device inputs motion information when using the specific device, the motion information input and an initial registration pattern input beforehand are compared with each other, and use of the specific device is prohibited when the motion information input is determined different from the initial registration pattern.

The present invention also provides a motion image processing device for authenticating a user when the user uses a specific device, using motion information of an object obtained from a plurality of time series frames.

This device comprises, as means for calculating the motion information of the object, means for extracting contour shape characteristics of an object contained in time series images by processing a frame of the time series images; means for detecting a reference point in the frame, using the shape characteristic; and means for tracking the reference point over time to calculate the motion information of the object in a 3D space.

According to the present invention, there is also provided a motion image processing device for tracking motion of an object contained in time series images, using a contour shape characteristic. This device comprises means for extracting shape characteristics by processing a frame of the time series images; means for detecting a reference point in the frame, using the shape characteristic; means for tracking the reference point over time to calculate the motion information of the object in a 3D space; and means for modifying a display object provided beforehand, based on the motion information.

Preferably, the means for extracting shape characteristics of the motion image processing device according to the present invention extracts a contour based on edge information of an input image of the object, detects characteristic points including a bending point, which is a point with a quick change of an edge gradient direction based on edge information, a curving point, which is a point on a contour with inversion of a curvature sign and a moderate change of an edge gradient direction, and a transition point, which is a point on a contour with a change of a curvature from zero to other value, or vice versa, and a moderate change of an edge gradient direction, divides the contour into a straight line segment and a concave or convex curve segment based on a characteristic point, and combines segments obtained in the same frame, whereby a specific portion is detected in the image obtained by projecting the object.

Preferably, a motion image processing device of the present invention selects at least four or more points on a same plane in a 3D space, as a reference point for tracking motion (referred to also as a tracking reference point), in an image in an initial frame, and detects a point corresponding to each of the reference points in a frame different in time from the initial frame to be tracked.

Also, preferably, a motion image processing device of the present invention calculates motion information of the plane in a 3D space, based on the plurality of reference points for tracking and corresponding points obtained in a plurality of time series frames, and also on limited motion assumption for a plane in a 3D space such that pairs of the reference points and corresponding points are located on a same plane in a 3D space, and modifies a model and a pointer provided beforehand, based on the motion information calculated.

Further, preferably, a motion image processing device of the present invention comprises motion information input means for inputting motion information; motion information comparison means for receiving the motion information from the motion information input means and comparing the motion information received and an initial registration pattern input beforehand; use allowing controller means for sending a signal for prohibiting use of the specific device to the specific device when comparison by the motion information comparison means proves that the motion information received differs from the initial registration pattern.

Also, the present invention provides a computer-readable medium storing a program for tracking motion of an object contained in time series images, using a contour shape characteristic. By executing the program, the computer extracts a shape characteristic by processing a frame of the time series images; detects a reference point in the frame, using the shape characteristic; tracks the reference point over time to calculate the motion information of the object in a 3D space; and modifies a display object provided beforehand, based on the motion information.

Preferably, the step of extracting shape characteristic, comprises the steps of extracting a contour based on edge information of an input image of the object detecting characteristic including a bending point, which is a point with a quick change of an edge gradient direction based on edge information, a curving point, which is a point on a contour with inversion of a curvature sign and a moderate change of an edge gradient direction, and a transition point, which is a point on a contour with a change of a curvature from zero to other value, or vice versa, and a moderate change of an edge gradient direction, dividing the contour into a straight line segment and a concave or convex curve segment based on a characteristic point, and combining segments obtained in the same frame, whereby a specific portion is detected in the projected image of the object.

Further, preferably, at least four or more points on a same plane in a 3D space are selected, as a reference point for tracking motion, in an image in an initial frame, and a corresponding point corresponding to each of the reference points is detected in a frame different in time from the initial frame to be tracked.

When the computer executes a program storing a medium of the present invention, the computer calculates motion information of the plane in a 3D space, based on the plurality of reference points for tracking and corresponding points obtained in a plurality of time series frames, and also on a limited motion assumption for a plane in a 3D space such that pairs of the reference points and the corresponding points are located on a same plane in a 3D space, and modifies a model and a pointer provided beforehand based on the motion information calculated.

Further, preferably, by executing a program stored in the medium of the present invention, the computer authenticates a user when the user uses a specific device, using motion information of an object obtained from a plurality of time series frames.

The present invention also provides a user authentication system for allowing or prohibiting use of a specific device, using motion information of an object obtained from a plurality of time series frames.

In this system, a user authentication device of the specific device compares initial registration pattern based on initial motion information, and motion information of an object, input when using the specific device, to thereby authenticate a user operating the specific device, and, use of the specific device is prohibited when comparison proves illegal use, and allowed when comparison proves authorized use.

Here, preferably, the user authentication device of the specific device in a user authentication system comprises motion information input means for inputting motion information when the user uses the specific device; use allowing controller means for allowing or prohibiting use of the specific device, motion information comparison means for comparing the motion information input by the user when using the specific device and the initial registration pattern input beforehand; and transmission means for sending electric waves when the use allowing controller means prohibits use of the specific device, and is connected to a server via a network, the server comprises receiver means for receiving the electric waves sent by the transmission means, the user inputs motion information via the motion information input means when using the specific device, the motion information comparison means compares the motion information input and the initial registration pattern stored in a motion information storage means, the use allowing controller means sends a use prohibiting signal to the specific device when the motion information input differs from the initial registration pattern registered in the motion information storage means, and the receiver on the server side receives the electric waves sent from the transmission means to obtain position information of the specific device.

Also, preferably, after the use allowing controller means sends a use prohibiting signal to the specific device, preferably, the user authentication device sends an irregular signal to the server, informing an attempt of an irregular use of the specific device, and the server receives the signal whereby the receiver means on the server side starts receiving the electric waves from the transmission means.

The present invention also provides a motion image processing method for tracking an object in time series images to extract motion of the image, wherein a reference point to be tracked between adjacent image frames of an object photographed by image capturing means is selected from among points on a contour of the object, using information obtained from the contour.

Here, preferably, information on a normal direction of the contour of the object may be used as information obtained from the contour of the object, and reference points are selected such that normal directions thereof include at least two normal directions which differ from each other by an angle of about 90°.

Also, preferably, a provisional corresponding point corresponding to the reference point using the information obtained from the contour is obtained, and a coefficient of a polynomial capable of expressing motion of the object, and having a variable indicative of a position of a corresponding point in an image frame is obtained using coordinates of the provisional corresponding point, whereby the reference point is tracked.

Further, preferably, a normal direction of the contour may be used as information obtained from the contour.

A polynomial expressing Affine conversion may be used as the polynomial.

The present invention also provides a motion image processing device for tracking an object in time series images to extract an image of the object. In this device, a reference point to be tracked between adjacent image frames of an object photographed by image capturing means is selected from among points on a contour of the object, using information obtained from the contour.

Preferably, information on a normal direction of the contour of the object may be used for the information obtained from the contour of the object, and reference points are selected such that normal directions thereof include at least two normal directions which differ from each other by an angle of about 90°.

Also, in this device, a provisional corresponding point corresponding to the reference point is obtained using the information obtained from the contour, and a coefficient of a polynomial capable of expressing motion of the object and having a variable indicative of a position of a corresponding point on an image frame, is obtained using coordinates of the provisional corresponding point, whereby the reference point is tracked.

The present invention also provides a computer-readable medium for storing a program for tracking an object in time series images to extract an image of the object. The computer executes the program to thereby conduct at least selection of a reference point to be tracked between adjacent image frames of an object photographed by image capturing means, from among points on a contour of the object, using information obtained from the contour.

Preferably, information on a normal direction of the contour of the object may be used for the information obtained from the contour of the object, and reference points are selected such that normal directions thereof include at least two normal directions which differ from each other by an angle of about 90°.

Also, the present invention also provides a program for tracking motion of an object contained in time series images, using contour shape characteristic. The program performs, by being executed by a computer, at least the steps of: extracting shape characteristic by processing a frame of the time series images; detecting a reference point in the frame, using the shape characteristic; tracking the reference point over time to calculate the motion information of the object in a 3D space; and modifying a display object provided beforehand, based on the motion information.

Further, the present invention provides a program for tracking an object in time series images to extract motion of the object. The program performs, by being executed by a computer, at least selection of a reference point to be tracked between adjacent image frames of an object photographed by image capturing means, from a contour of the object, using information obtained from the contour.

A program of the present invention may be stored in a medium, such as a computer readable CD-ROM, RD, hard disk, or a semiconductor memory. A program stored in a medium may be installed to a computer for execution.

BEST MODE FOR CARRYING OUT THE INVENTION

Preferred embodiments of the present invention will be described with reference to the accompanying drawings.

Figure 1:
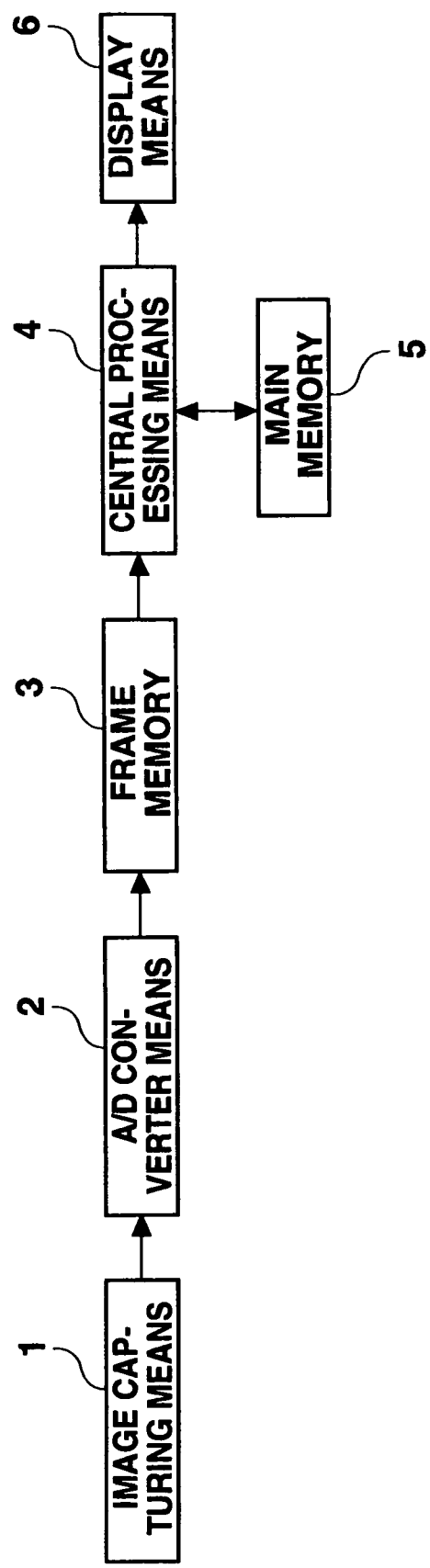
FIG. 1 is a schematic diagram showing a structure of a motion image processing device according to the present invention.

FIG. 1 is a schematic diagram showing a structure of a motion image processing device of the present invention. 1 is an image capturing means having an image sensor for capturing an image of an object, and specifically is a camera. 2 is A/D converter means for converting image information in the form of an analogue signal captured by the image capturing means 1 into image information in the form of a digital signal. 3 is a frame memory for storing digital image information, converted by the A/D converter means, for every time series frame. 4 is a central processing unit (CPU) for monitoring and controlling all of the processing devices, storing algorithm constituting of process flows of a motion image processing method of the present invention. 5 is a main memory for use in signal processing by the CPU 4. 6 is a display means for displaying an image processed by this processing device.

Note that a digital camera having functions of an image capturing means 1 and an A/D converter means 2 may be used as an image capturing means 1, instead of an analogue camera mentioned above, to achieve the object of the present invention.

Figure 2:
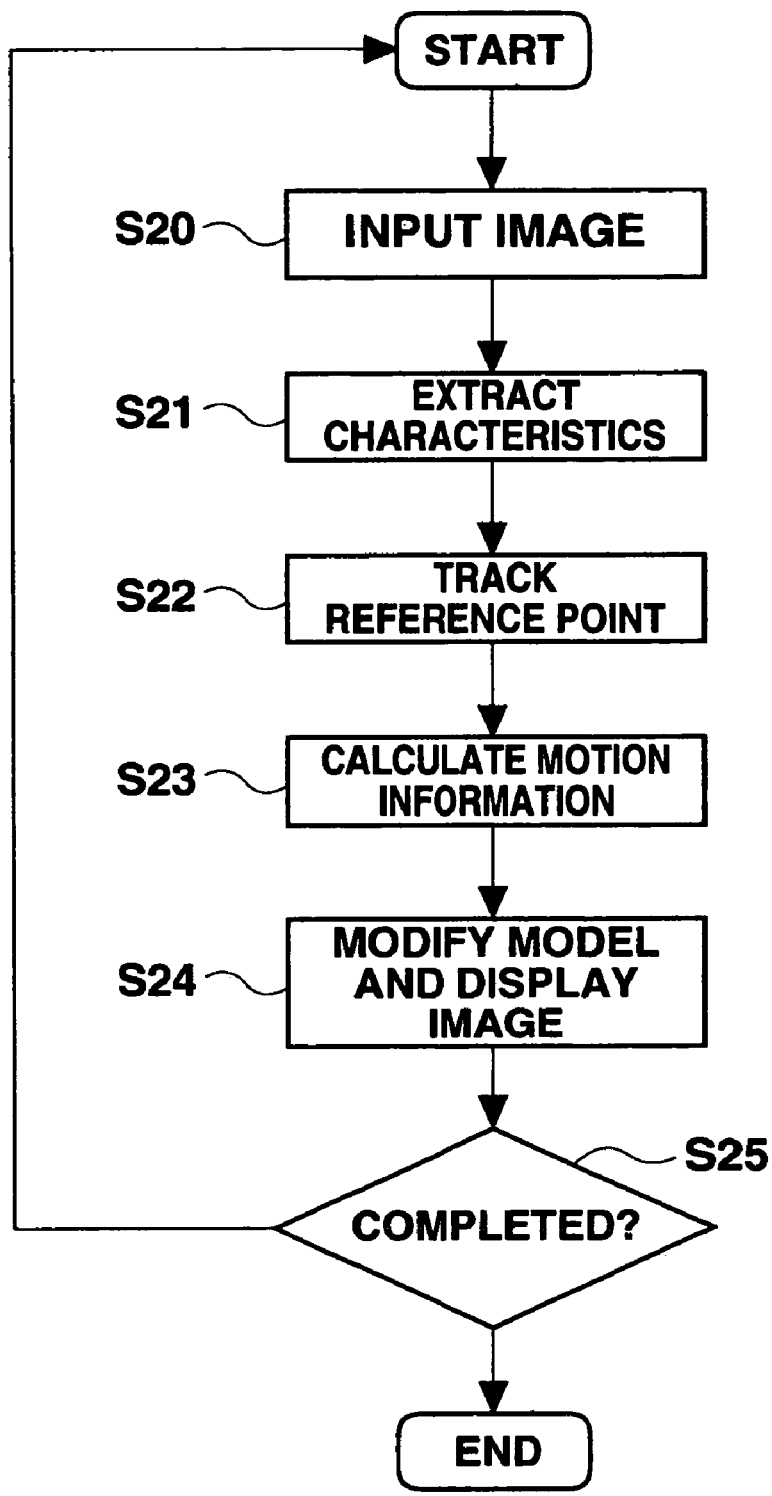
FIG. 2 is a flowchart of a motion image processing method according to the present invention.

FIG. 2 is a flowchart of a process procedure of a motion image processing method relating to a preferred embodiment of the present invention, which will be described below, while describing the procedure.

As shown, this method includes image input (S20), characteristic extraction (S21), reference point tracking (S22), motion information calculation (S23), model modification and image displaying (S24), each process being described in detail in the following.

I. Characteristic Extraction to Determine Reference Point (S21)

In a preferred embodiment of the present invention, an object, or a finger, is shot in advance using an image capturing means 1 at step S20 whereby contour shape information on the finger is obtained.

Figure 4:
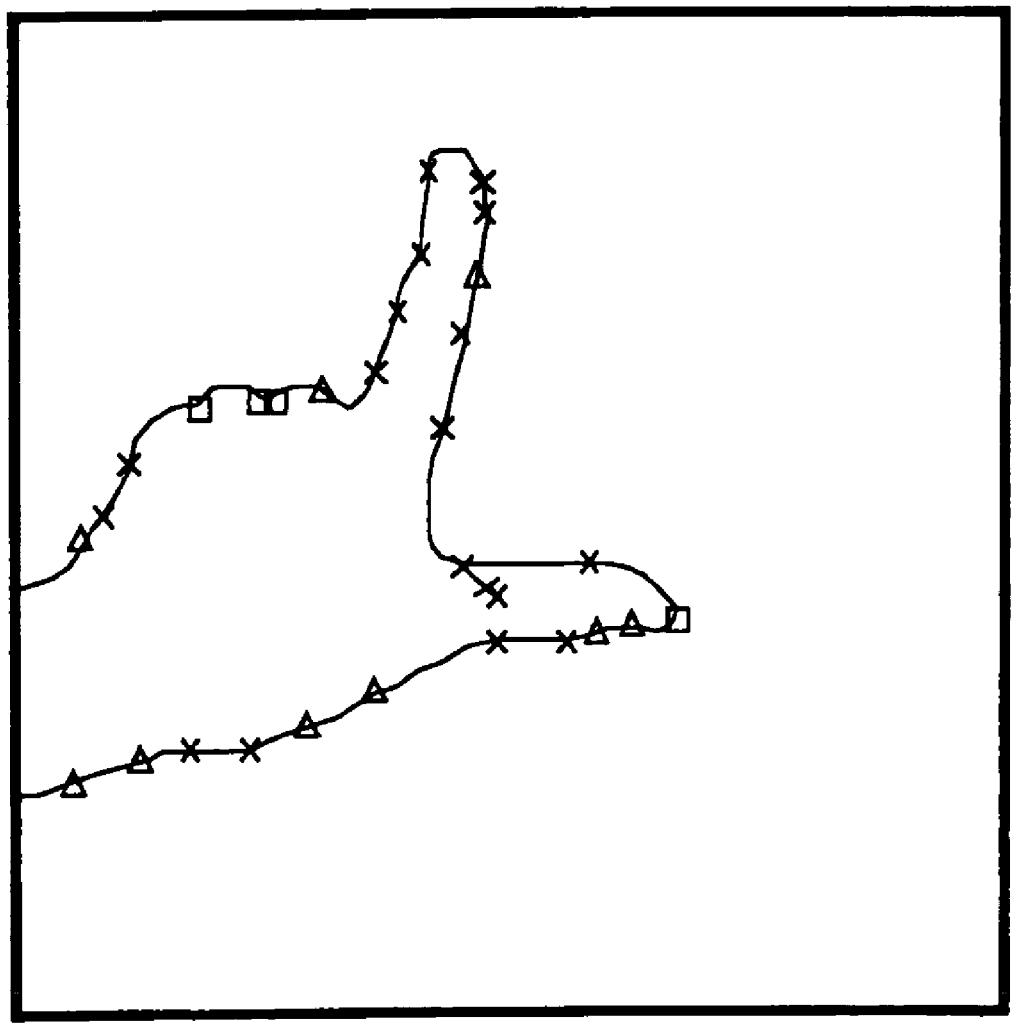
FIG. 4 is a diagram showing characteristic points on a contour.

FIG. 4 shows an example of detecting characteristic points on a finger contour, based on edge information on a finger, detected in the initial frame of time series images input. Respective marks in the drawing represent characteristic points, including a bending point (□), a changing point (Δ), and a transition point (X).

In the present invention, "a bending point" is a point, with a quick change of an edge gradient direction based on edge information. "A curving point" is a point on an object contour, with inversion of a curvature sign and a moderate change of edge gradient. "A transition point" is a point on an object contour, with a change of a curvature from zero to another value, or vice versa, and a moderate change of edge gradient.

At S21 in FIG. 2, a contour is divided into a straight line segment and a concave or convex curve segment based on these characteristic points.

Then, basic shape characteristics (segments), obtained by dividing a contour, are combined according to a general relationship.

Figure 5:
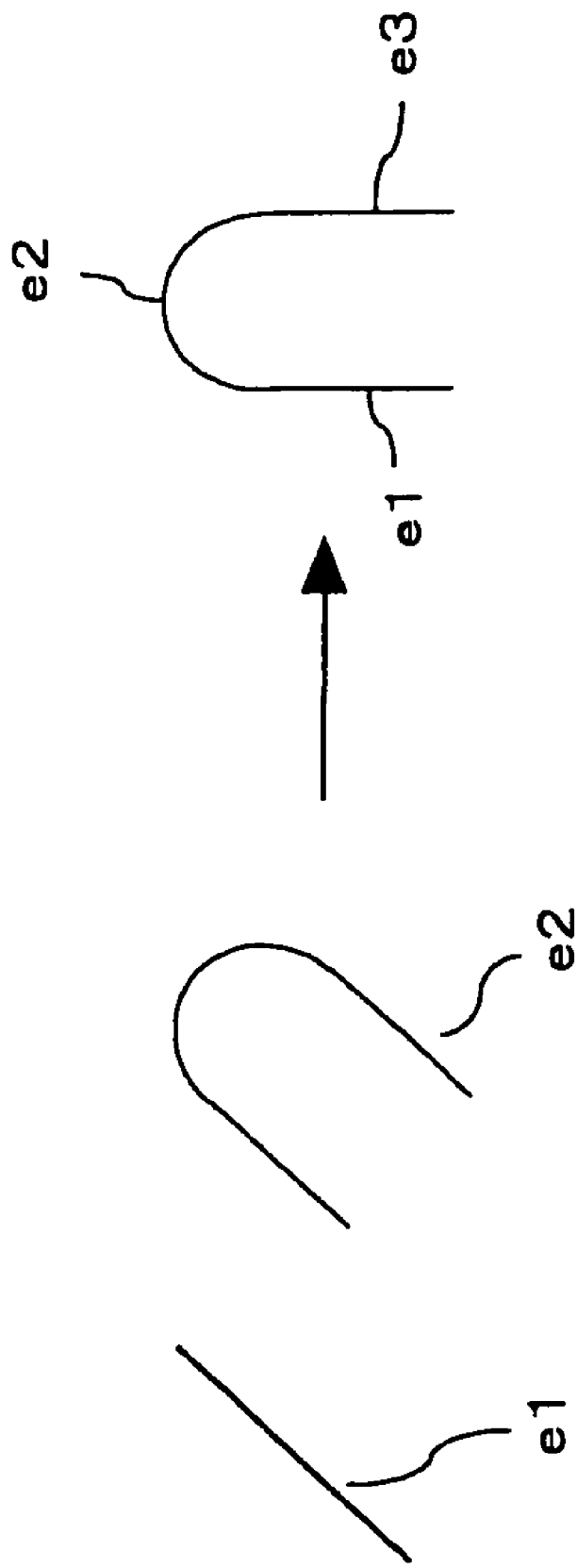
FIG. 5 is a diagram showing characteristic extraction through combination of basic shape characteristics.

Subsequently, a reference point for tracking (hereinafter referred to as a tracking reference point) is selected from points on a superior shape characteristic. In the example shown in FIG. 5, basic shape characteristics, namely a straight line segment (e1 in the drawing) and a curve segment (e2 in the drawing), are coupled to each other at a transition point to thereby describe a superior shape characteristic comprised of segments e1, e2, e3.

In this example, the segments e1 and e2, the segments e2 and e3, and the segments e1 and e3 respectively have a relationship (transition e1, e2), (transition e2, e3), and (parallel e1, e3). Characteristics are extracted from an image, based on a description of a superior shape characteristic, as described above.

Figure 6:
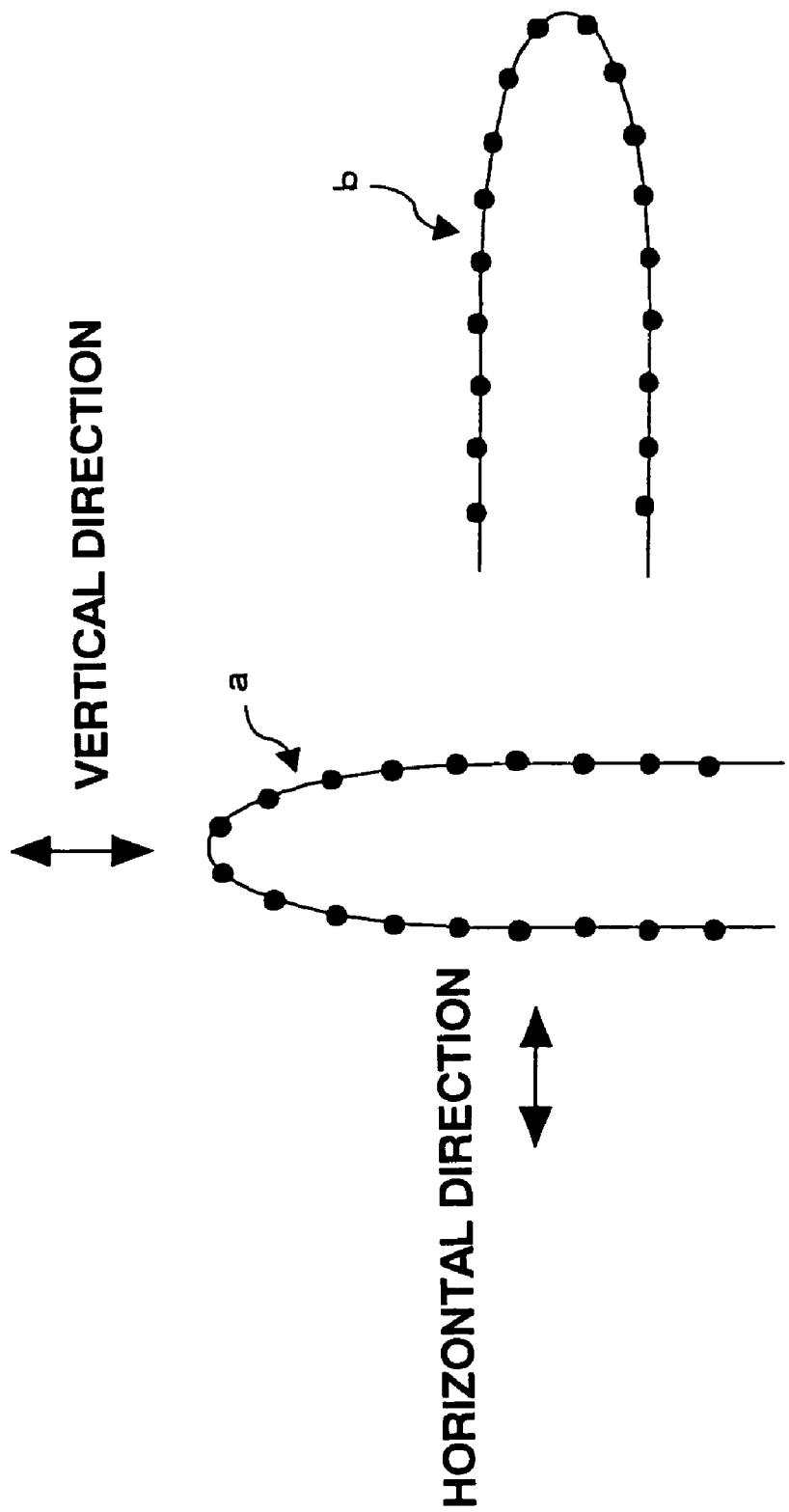
FIG. 6 is a diagram showing selection of a segment and a reference point to avoid an aperture problem.

FIG. 6 shows an example in which reference points are set on a shape characteristic formed by combining segments. Here, when points ● in the segment "a" are selected as reference points, corresponding points thereof can be found properly in an image in a different frame with respect to horizontal motion in the drawing. However, with respect to vertical motion, proper corresponding points cannot be obtained, except for a few points on the curving part of the segment. This is referred to as an aperture problem (a problem that a corresponding point corresponding to a tracking reference point at time t cannot be uniquely determined at time (t+1)), and must be avoided in motion image processing.

According to the present invention, this problem can be avoided by selecting a plurality of segments, for example, segment "a" and segment "b", each constituting a superior shape characteristic of a finger, such that they form an angular difference of about 90° between each other. A condition for segment combination may be desirably determined as long as an aperture problem can be avoided. Segments other than segment "b" in FIG. 6 may be selected.

Further, points (a reference point) on a segment, for example points ● in the segment "a" in FIG. 6, may be sampled with an equal interval, for tracking.

II. Reference Point Tracking (S22)

At step S22, two or more (for example, at least four or more) reference points (●) on the same plane in a 3D space are selected from points selected at step S21 in the initial frame, and how the selected reference points move to the respective corresponding points in a different frame, in other words, in a predetermined time, is detected.

It should be noted that the fact that two plane patterns obtained by projecting a point on a plane in a 3D space onto two different planes (e.g., an image projection plane, and so on) hold an Affine convertible relationship, can be utilized.

Figure 7:
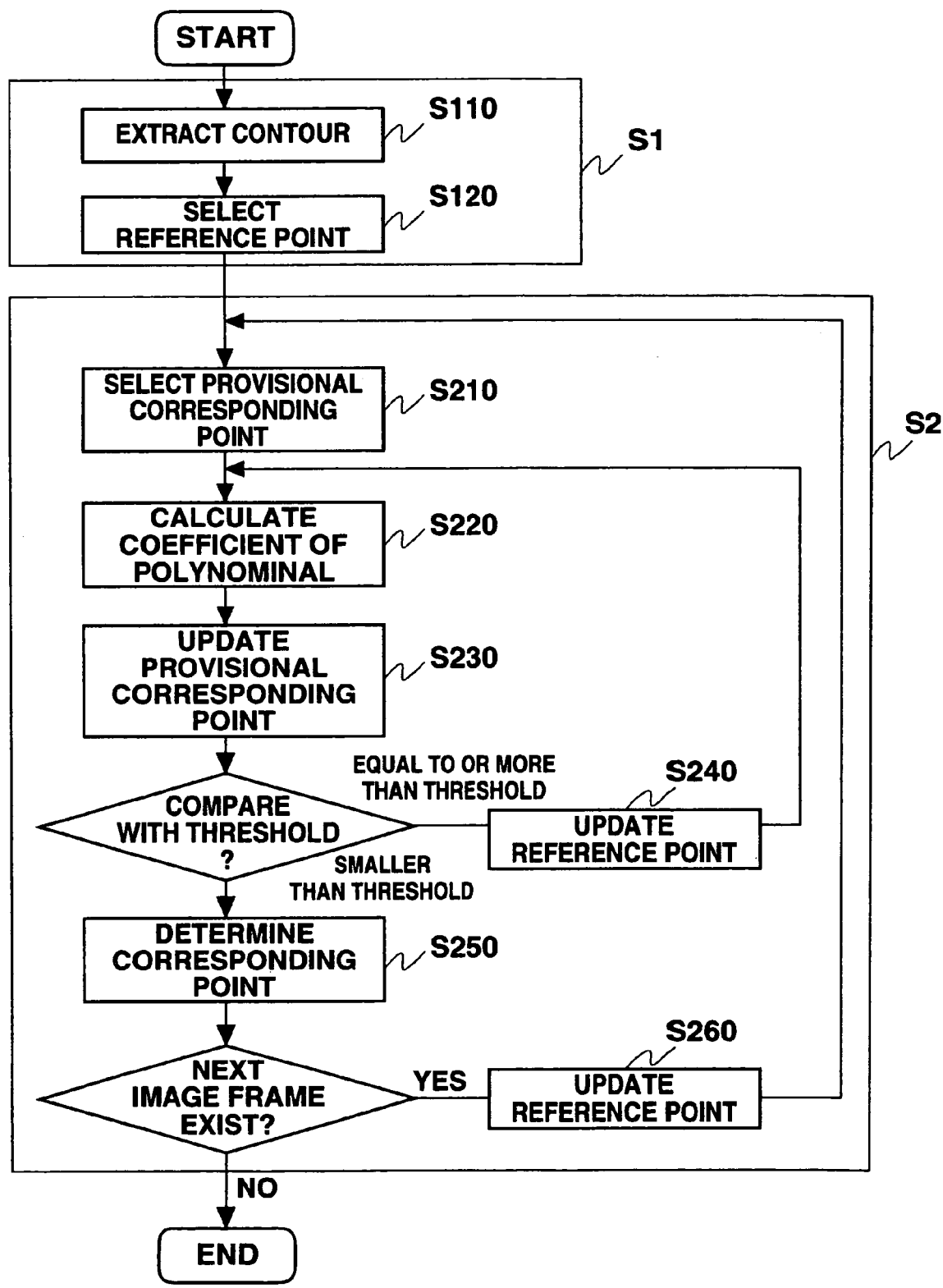
FIG. 7 is a flowchart for selection of a reference point and determination of a corresponding point.

FIG. 7 is a flowchart for selection of reference points and determination of corresponding points thereof. As shown, this method consists of a process for an initial image frame (S1) and a process for subsequent image frames (S2).

At step S110, a contour of an object is extracted from the initial image frame, and normal directions at respective points on the contour are calculated based on a contour nearby (S110).

At step S120, reference points are selected from the points on the contour in consideration of the normal directions (S120), specifically, such that associated normal directions vary in two or more directions, instead of deviating in one particular direction, and that an angular difference of about 90° is formed between each of the normal directions. In this embodiment, twenty reference points are selected, and a reference point angle is set at about 90°, which, however, is not a limiting example. Instead, a reference point angle may be determined desirably in a range between 45° and 135°, or even 80° and 100°

Figure 8:
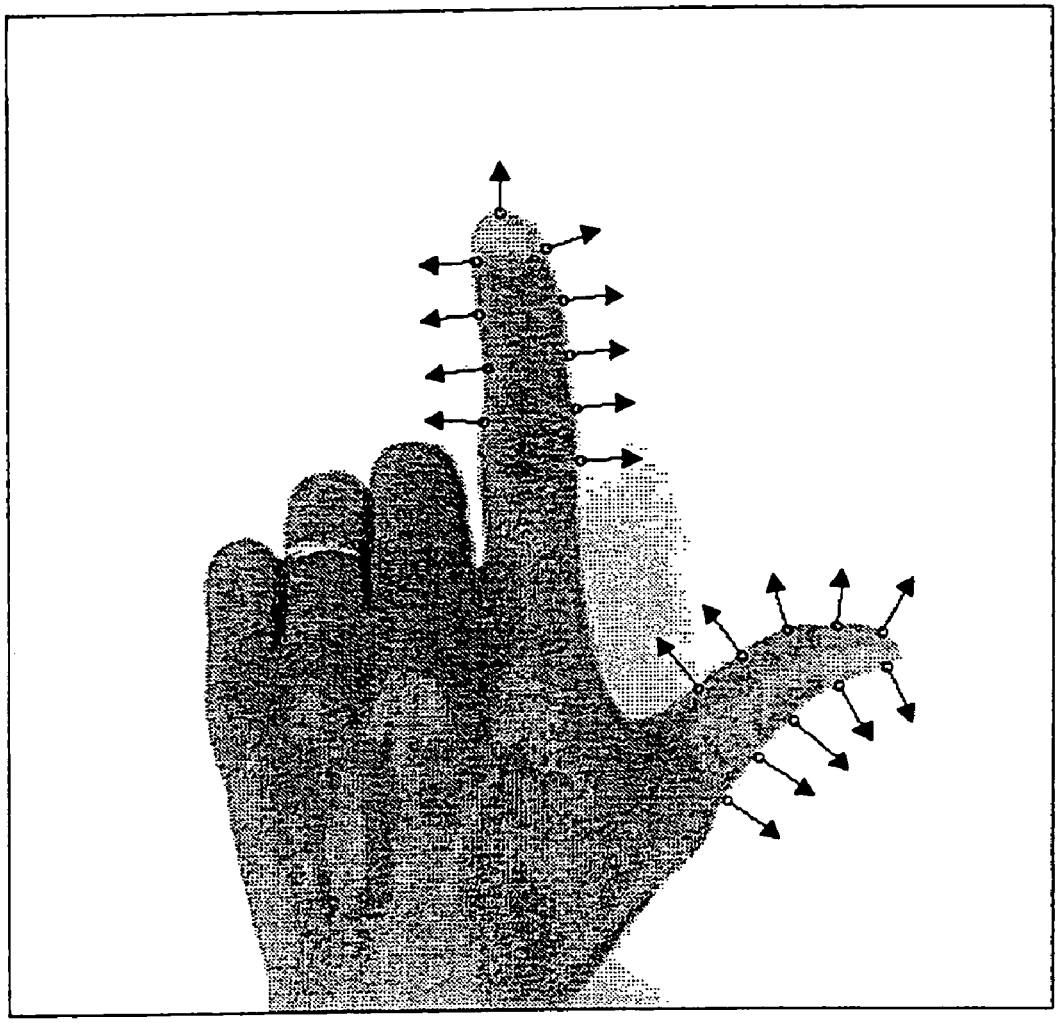
FIG. 8 is a diagram explaining an example of selected reference points.

FIG. 8 shows an example of reference points selected so as to meet the above condition, in which ○ indicates a reference point, and each segment at each reference point indicates a normal direction at the associated reference point.

At step S2, reference points obtained at step S1 are tracked in subsequent image frames.

In this embodiment, it is assumed that relationship between a reference point and its corresponding point can be expressed by means of Affine conversion. In actual fact, it is assumed that motion of a finger is based on translation and rotation on a desired plane, the motion can be expressed by means of Affine conversion. Note that "a corresponding point" here refers to a point corresponding to a reference point after an object, or a finger, has moved.

Here, assuming that coordinates of a reference point and those of a corresponding point are expressed as (X, Y) and (x, y), respectively, they hold a relationship expressed by the following polynomials (1), (2).

$$x=aX+bY+e \quad (1)$$

$$y=cX+dY+f \quad (2)$$

wherein a, b, c, and d are coefficients indicative of rotation components of the object motion, and e and f are coefficient indicative of translation components thereof.

At step S210, a provisional corresponding point is determined at a point where the normal of the associated reference point of an object before motion (i.e., an object in a preceding image frame) comes across the contour of the object moved (i.e., an object in the next image frame) (S210). The crossing point between the normal of the reference point and the contour can be determined by examining luminous of pixels on the normal of the reference point and finding a pixel having a significantly different luminous from that of its adjacent pixel.

Figure 9:
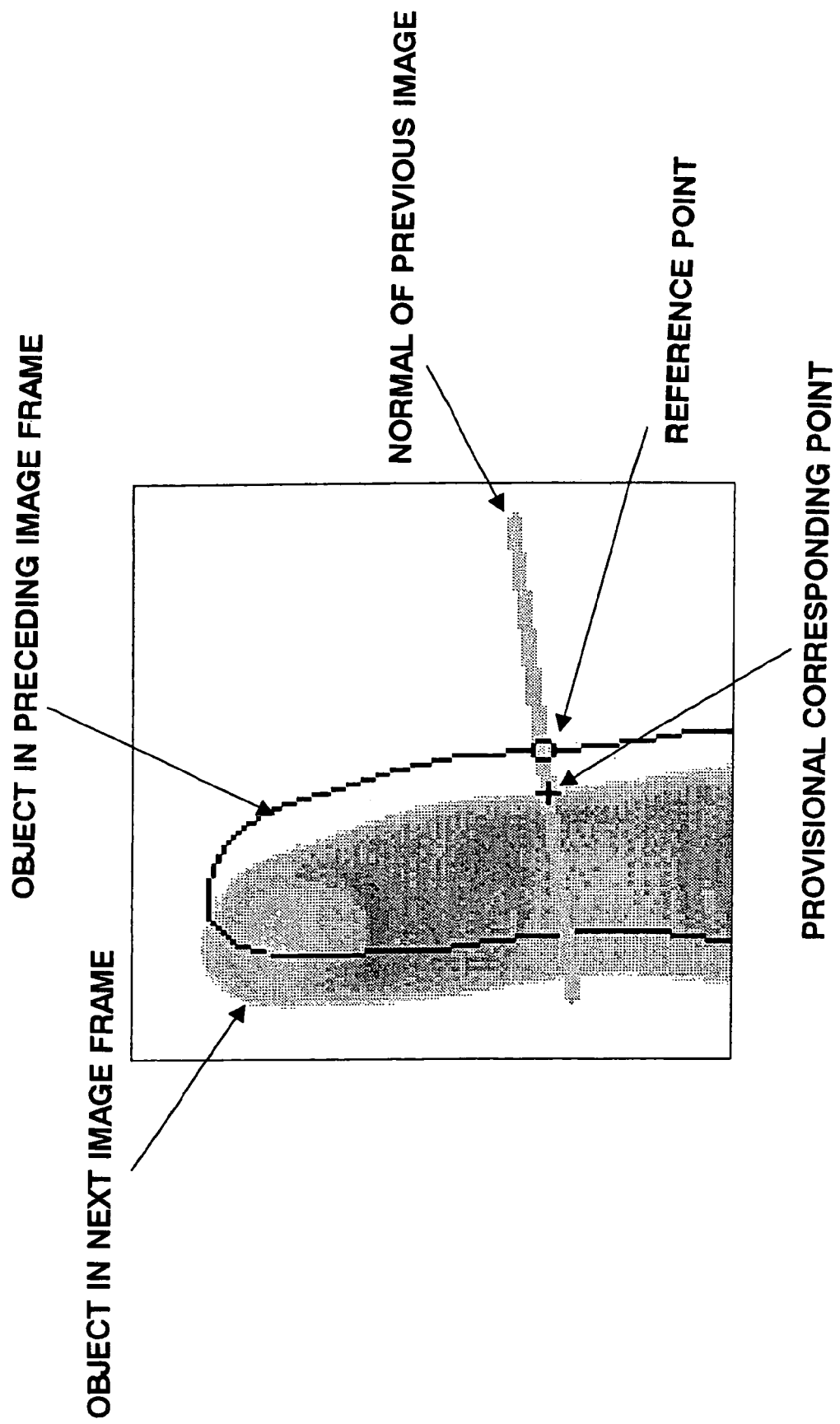
FIG. 9 is a diagram explaining a provisional corresponding point obtained.

FIG. 9 is a diagram showing a reference point and a provisional corresponding point corresponding to the reference point, in which the contour represents the position of a finger in a preceding image frame (i.e., a frame before the finger moved), ○ indicates a reference point, and + indicates a provisional corresponding point. A normal line of the reference point on the finger contour in the preceding image frame is employed here.

At step S220, coefficients a, b, d, d, e, and f of the above polynomials (1), (2) are obtained, based on coordinates of the reference point and that of the provisional corresponding point. However, the coefficients a, b, c, d, e, and f cannot be uniquely determined because a provisional corresponding point is not a true corresponding point. Therefore, in this embodiment, approximations of coefficients a, b, c, d, e, and f are obtained by means of least squares such that errors between the coordinates obtained based on the reference point coordinates and using the polynomials including coefficients a, b, c, d, e, and f obtained as above, and the coordinates of a provisional coordinate point is small, in other words, such that an average of the distances for all twenty reference points is minimized (S220).

Figure 10:
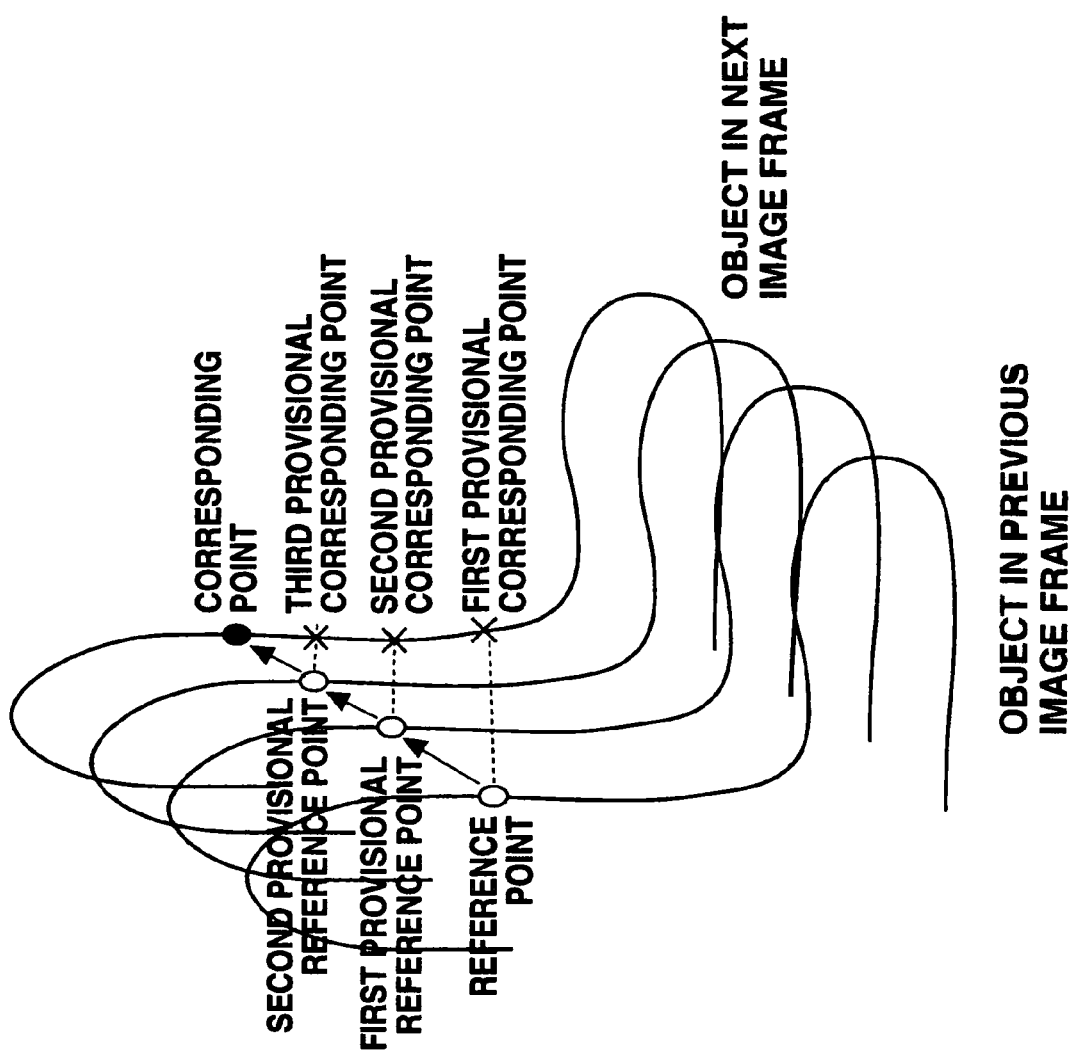
FIG. 10 is a diagram showing a transition of a reference point to a corresponding point.

At step S230, positions to which the twenty reference points will move are determined using coefficients a, b, c, d, e, and f, obtained at step S220. FIG. 10 is a diagram showing transition from a reference point in FIG. 9 to a provisional reference point. According to the drawing, the reference point is supposed to have moved to the first provisional reference point. Coordinates of the first provisional reference points, however, do not coincide with those of the corresponding point, though they are getting closer, because of an error due to the fact that coefficients a, b, c, d, e, and f obtained at step S220 of the polynomials are approximations. This error can be reduced by obtaining a more accurate approximation, using "a first provisional reference point".

For this purpose, at step S240, the reference point is updated (replaced) by the n-th provisional reference point, should a distance between "the coordinates of the n-th provisional reference point" and "those of the n-th provisional corresponding point" be equal to or more than a predetermined threshold. With updating of the provisional corresponding point and repetition of the process at steps S220 and S230, the reference point sequentially shifts to the first and then second provisional reference points. Accordingly, approximations of coefficients a, b, c, d, e, and f gradually converge until a final corresponding point is determined (S220, S230, S240).

As a result of the processing at steps S220 and S230, it is known that a reference point finally shifts to a corresponding point. At step S250, that corresponding point is determined (S250).

At step S260, when a next image frame remains, the corresponding point obtained at step S250 is used as a reference point in the next image frame (S260).

III. Motion Information Calculation (S23)

At step S23 in FIG. 2, motion information of a plane pattern is calculated based on a relationship between coordinates of a reference point in an initial frame, which is tracked at step S22, and those of its corresponding point in a frame at a different time, and also on an assumption of limited motion (an assumption that an object be within a view field and be reliably photographed even for a frame at a different time) for a plane in a 3D space. Here, by imparting a focal length of a lens of an image capturing system, motion information can be obtained, including translation 3 freedom, rotation 3 freedom, a normal direction of the plane, and a distance from the origin of a coordinate system to the foot of perpendicular on the plane.

It should be noted that, because a translation vector is obtained as a ratio relative to the distance, the distance must be obtained in any method in order to calculate an accurate motion amount, though any value may be used as the distance for relative motion calculation.

An example of motion information calculation will be described in the following.

Figure 11:
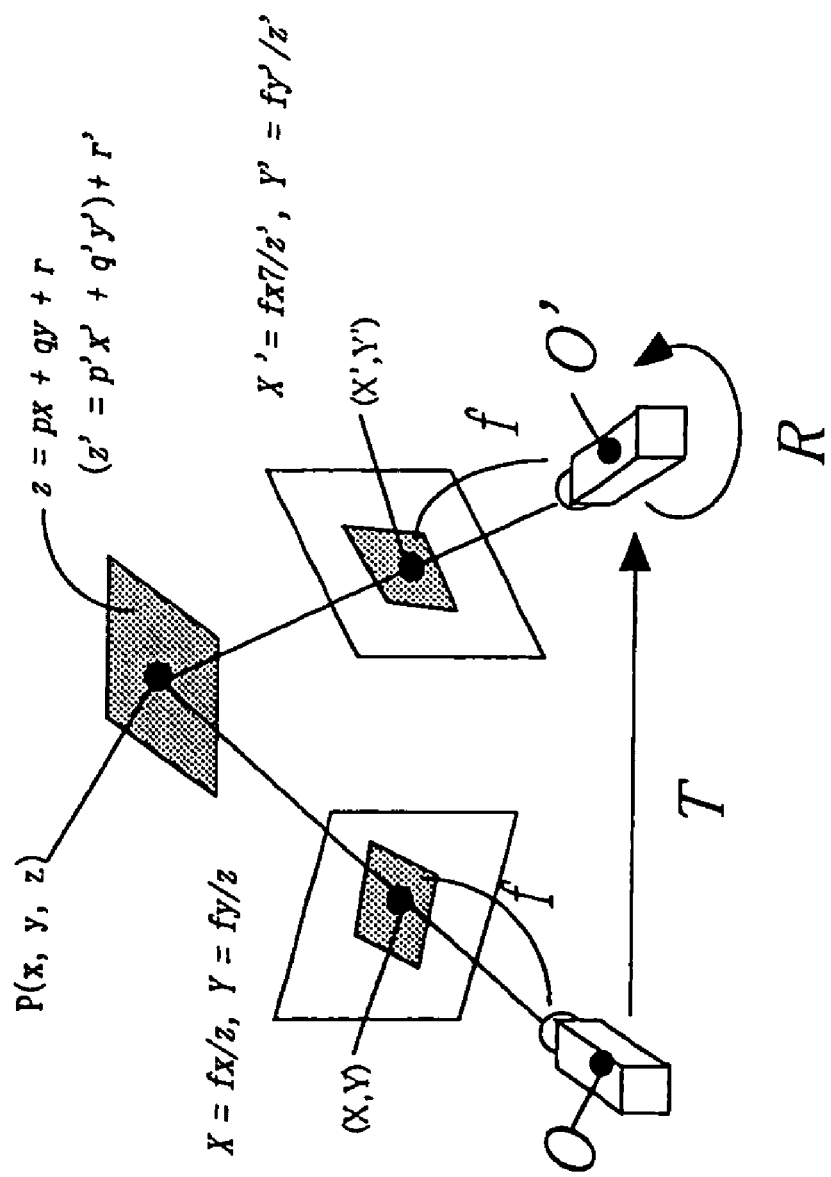
FIG. 11 is a diagram illustrating a concept for calculation of motion information.

In the case where a plane in air is observed, as shown in FIG. 11, motion of a place relative to a camera has the same effect as the motion of a camera relative to a plane. Here, the latter will be taken as an example. Given point P on a plane, P(x, y, z) can be expressed as z=px+qy+r in a coordinate system having an origin 0 at the optical center of the camera before moving, wherein p, q are plane gradient, and r is a distance along Z axis from 0 to the plane. When the coordinates of a point in an image, obtained by observing a point P on the plane, are (X, Y), and a focal distance of the optical system is denoted as "f", X=fx/z, Y=fy/z are obtained. Subsequently, suppose that the optical center of the image capturing system is translated to point 0' by an amount T, and then rotated around the center 0' by an amount R, and the same plane is observed in the resultant image capturing system. In the resultant coordinate system, point P on the plane can be expressed as z'=p'x'+q'y'+r'. Likewise, assuming no change in the focal distance of the optical system, point P (x, y, z) is expressed as point P' (x', y', z') in the resultant coordinate system, and X'=fx'/z', Y'=fy'/z' are obtained. Here, with T=(a, b, c)t, point P and point P' hold the following relationship.

$$\begin{pmatrix} x' \\ y' \\ z' \end{pmatrix} = \begin{pmatrix} R_{11} & R_{21} & R_{31} \\ R_{12} & R_{22} & R_{32} \\ R_{13} & R_{23} & R_{33} \end{pmatrix} \begin{pmatrix} x-a \\ y-b \\ z-c \end{pmatrix} \quad (3)$$

Based on the following (4) and (5), (6) is introduced.

$$\begin{cases} X = f\dfrac{x}{z} \\ Y = f\dfrac{y}{z} \\ z = px + qy + r \end{cases} \quad (4)$$

$$\begin{cases} x = \dfrac{rX}{f - pX - qY} \\ y = \dfrac{rY}{f - pX - qY} \\ z = \dfrac{rf}{f - pX - qY} \end{cases} \quad (5)$$

$$X' = \dfrac{T_{11}X + T_{21}Y + T_{31}f}{T_{13}X + T_{23}Y + T_{33}f} \quad (6)$$

$$Y' = \dfrac{T_{12}X + T_{22}Y + T_{32}f}{T_{13}X + T_{23}Y + T_{33}f}$$

wherein $T_{ij}$ is expressed as follows, $$k\begin{pmatrix} T_{11} & T_{12} & T_{13} \\ T_{21} & T_{22} & T_{23} \\ T_{31} & T_{32} & T_{33} \end{pmatrix} = \quad (7)$$

$$r\begin{pmatrix} R_{11} & R_{12} & R_{13} \\ R_{21} & R_{22} & R_{23} \\ R_{31} & R_{32} & R_{33} \end{pmatrix} + \begin{pmatrix} p \\ q \\ -1 \end{pmatrix}(a, b, c)\begin{pmatrix} R_{11} & R_{12} & R_{13} \\ R_{21} & R_{22} & R_{23} \\ R_{31} & R_{32} & R_{33} \end{pmatrix}$$

wherein k is a constant.

Based on the corresponding point in the image, nine unknown values consisting of a rotation matrix, a translation vector, and a plane parameter can be calculated through a least square method. Note that a translation vector has freedom 8 as a relative value based on a ratio relative to a distance to the plane, can be obtained.

IV. Model Manipulation, Image Display (S24)

At step S24 in FIG. 2, a display object, such as a model or a pointer, provided beforehand in a calculator, is subjected to coordinate conversion, based on motion information calculated at step S23, whereby the display object is modified according to the motion of the object, supplied as an input image. Specifically, a 3D model within the calculator may be moved or rotated for modification or a cursor may be moved and so on according to the motion of the finger.

Figure 12:
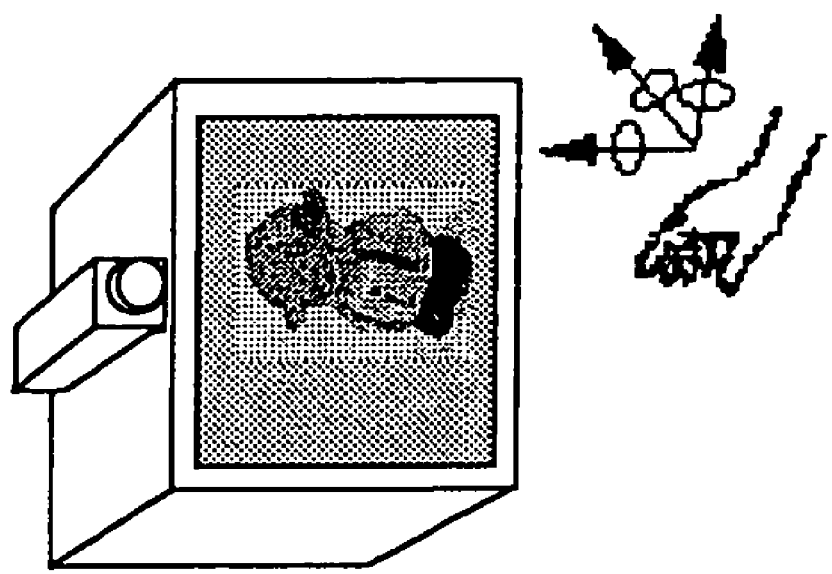
FIG. 12 is a diagram showing an applied example of the present invention.

FIG. 12 shows an example of application of the present invention to on-line shopping using a solid model in a virtual environment such as a virtual mall, or operation of a game character in the field of amusements.

V. User Authentication (S34)

Figure 3:
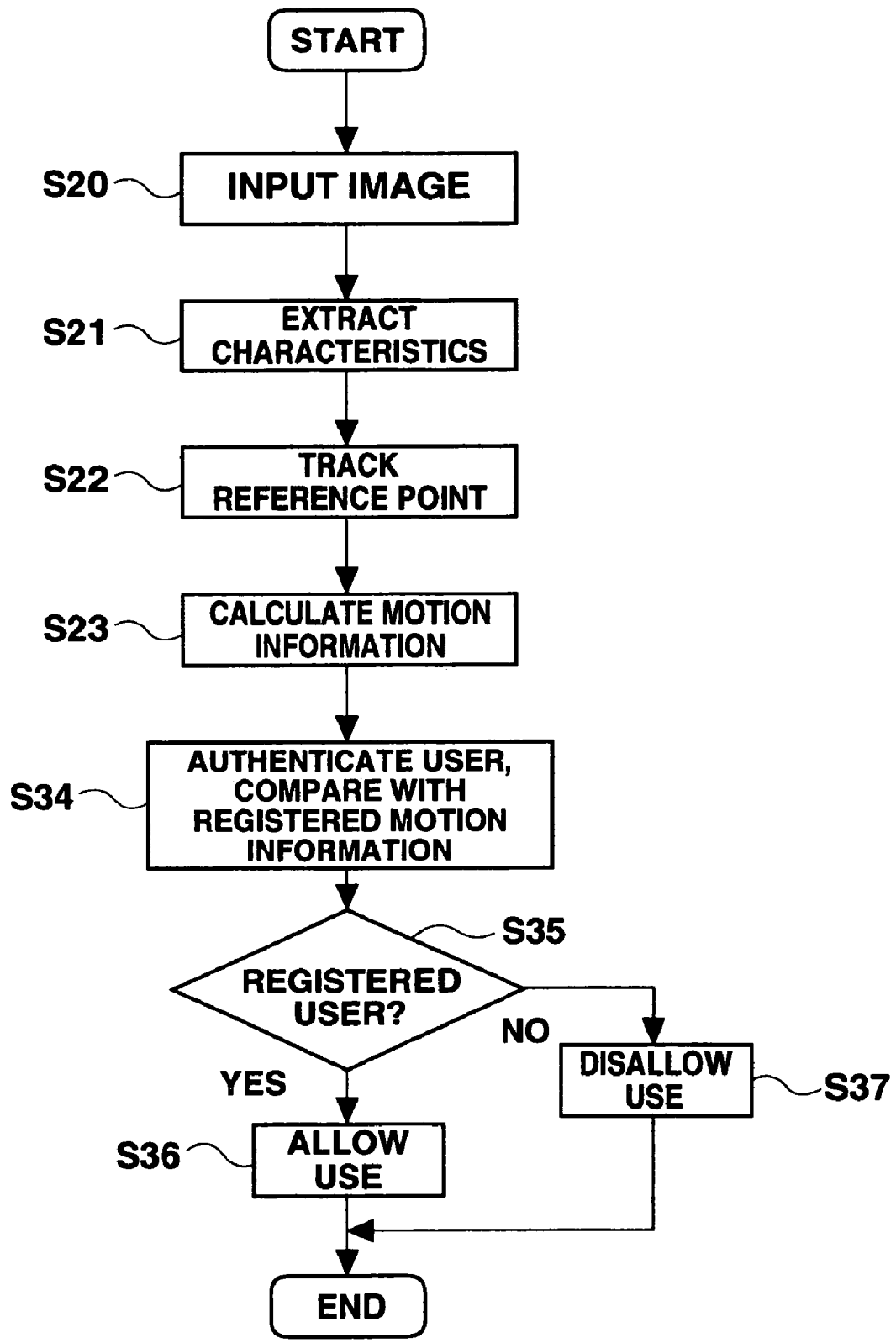
FIG. 3 is another flowchart of a motion image processing method according to the present invention.

FIG. 3 is a flowchart of a process procedure of a system for authenticating a user of a specific device, using the above described motion information, to allow or prohibit use of the specific device. A specific device may include a client device equipped with a user authentication device (such as a calculator and an access managing system) and a vehicle (such as airplanes, ships, motorcycles, bicycles, automobiles, and so on) managed by an individual or a corporation.

Figure 13:
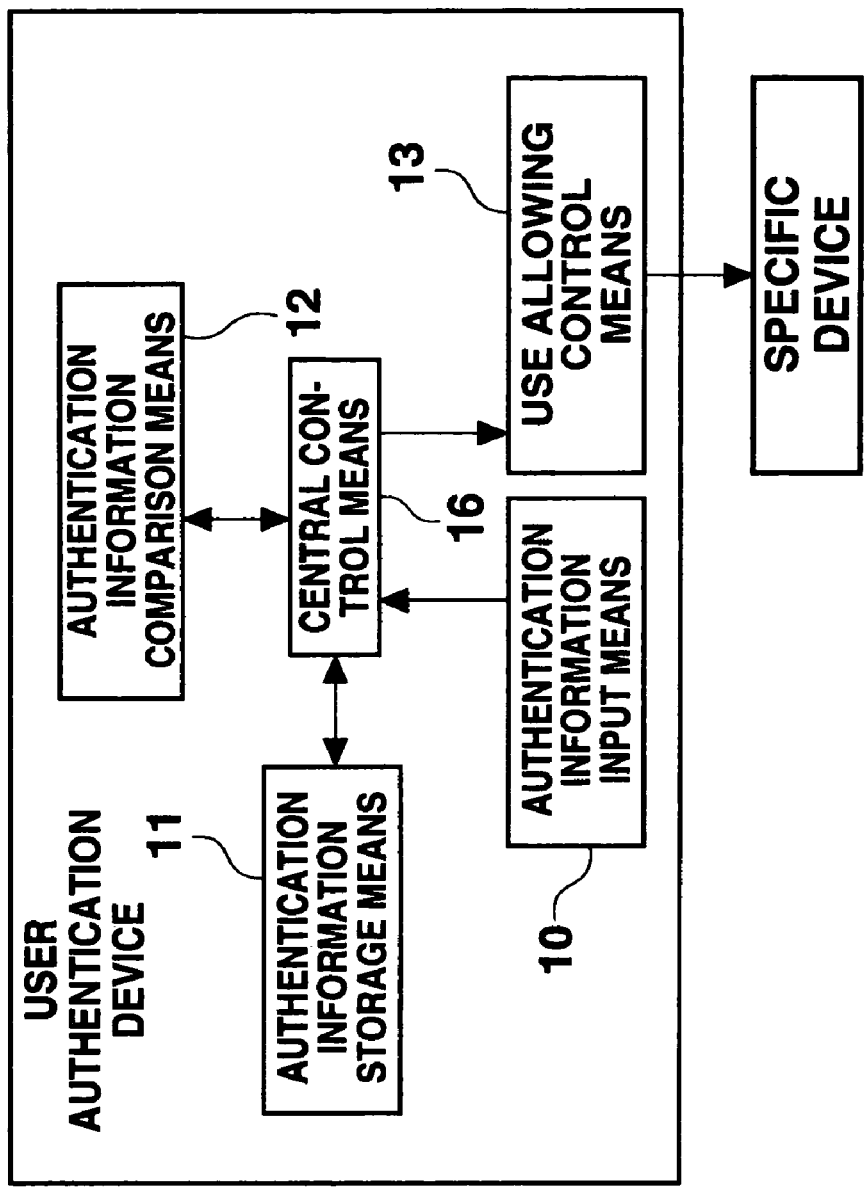
FIG. 13 is a diagram showing a user authorization device.
Figure 14:
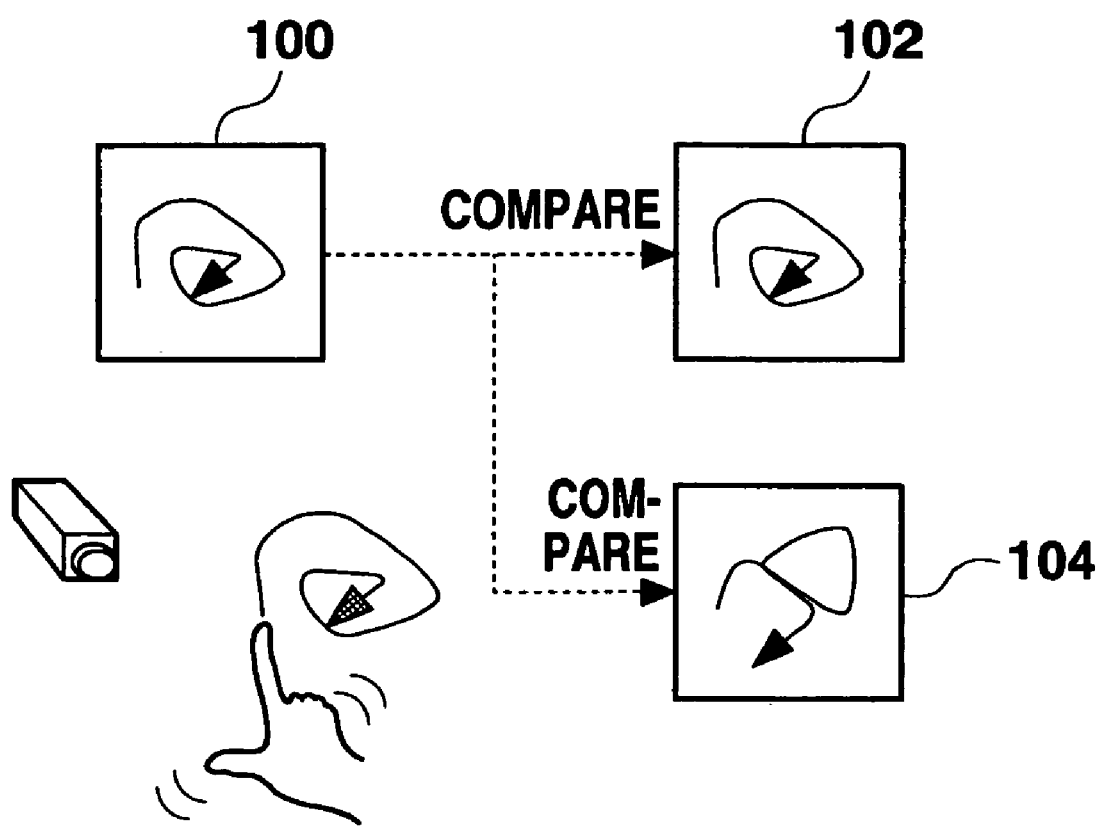
FIG. 14 is a diagram for inputting motion information to a user authorization device, for comparison.

While processing at S20 to S23 in FIG. 3 is identical to that at steps S20 to S23 in FIG. 2 and thus not described here in detail, processing at steps S34 and thereafter will be described with reference to FIG. 13 showing a device structure and FIG. 14 showing motion locus.

Prior to the process in FIG. 3, a user of a specific device must register authentication information, such as motion information, as an initial registration pattern, using an authentication information input means 10 (image capturing means 1, A/D converter means 2, and frame memory 3 in FIG. 1). The authentication information, such as motion information, is stored in the authentication information storage means 11.

To use a specific device, at step S34, motion information of an object (e.g., a finger), input via the authentication information input means 10 and calculated at S23, is compared via the authentication information comparison means 12 with an initial registration pattern 100 (initial motion information), registered in the authentication information storage means 11, and it is determined that the person is an authorized user when motion information 102 identical to the initial registration pattern 100 (initial motion information) was input. On the contrary, it is determined that the person is not an authorized user when motion information 102 different from the initial registration pattern 100 (initial motion information) was input.

When it is determined at step S35 that the person who input the motion information is a registered, authorized user, the use allowing control means 13 sends a signal to the specific device to allow the use thereof by that person. Whereas, when illegal use by a person other than a registered, authorized person is detected, the use allowing control means 13 sends a signal to the specified device at step S37 to prohibit the use thereof by that person.

Through the above processing, motion information is usable as a type of ID information, as a result of which, for example, a user is released from the burden of possessing his automobile key all the time, as he conventionally required.

Figure 15:
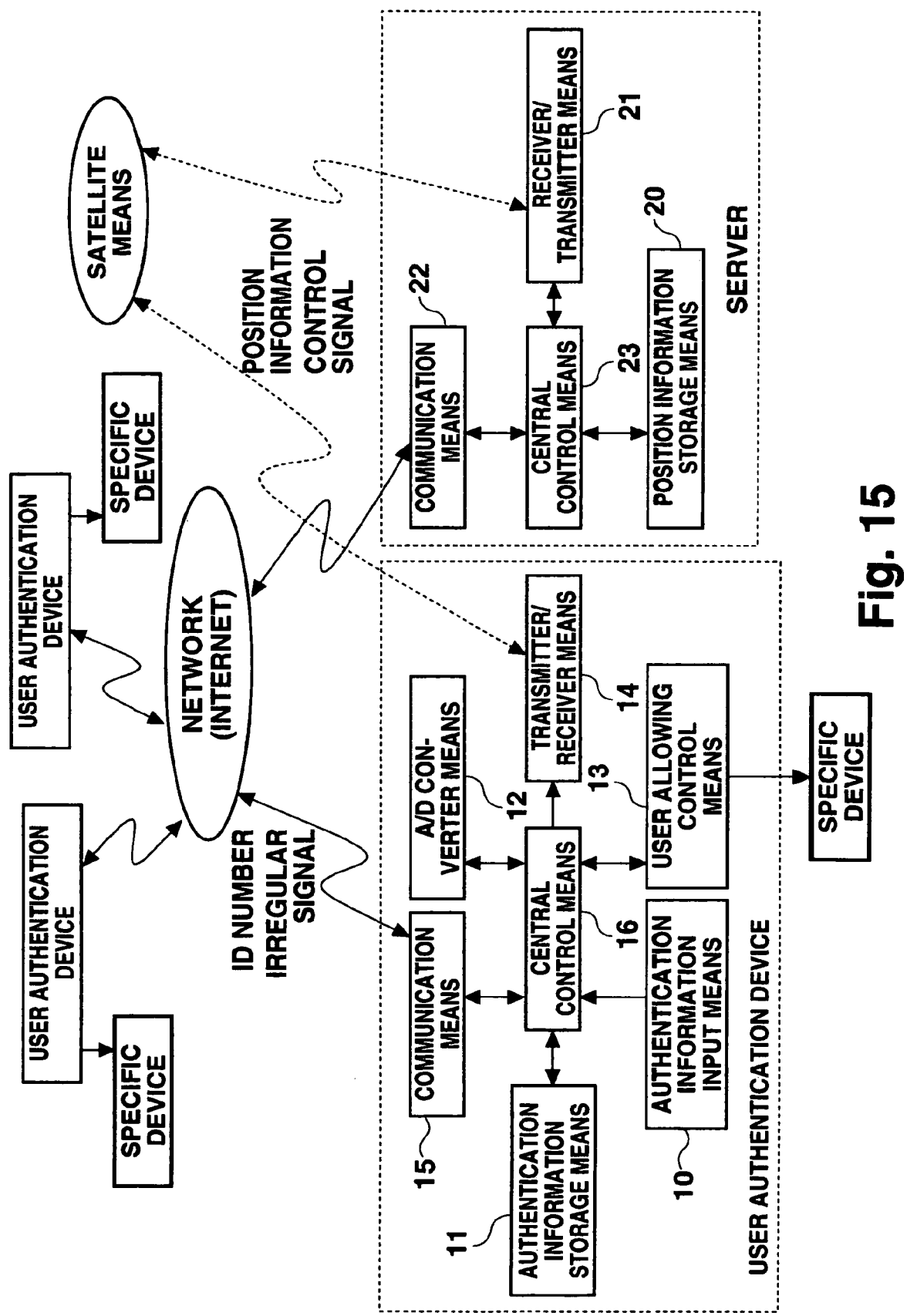
FIG. 15 is a diagram showing a structure of a user authorization system.

FIG. 15 is a diagram showing a preferred embodiment in which predetermined data is exchanged between a security managing server and a specific device described above via a network (Internet, portable phones, radio communication).

In the drawing, as described above with reference to FIG. 13, a user of a specific device registers beforehand an initial registration pattern (initial motion information) to the authentication information storage means 11 via the authentication information input means 10 (the image capturing means 1, A/D converter means 2, and frame memory 3 in FIG. 1), and thereafter inputs motion information using his finger and so on when wishing to use the specific device, and, the use allowing control means 13 sends a use allowing/prohibiting signal to the specific device based on the result. Here, in addition, there is provided a system capable of obtaining position information of a specific device (hereinafter an automobile will be referred to as an example) should the device be stolen, and taken away. Operation of the system will be described with reference to FIGS. 15 and 16.

Figure 16:
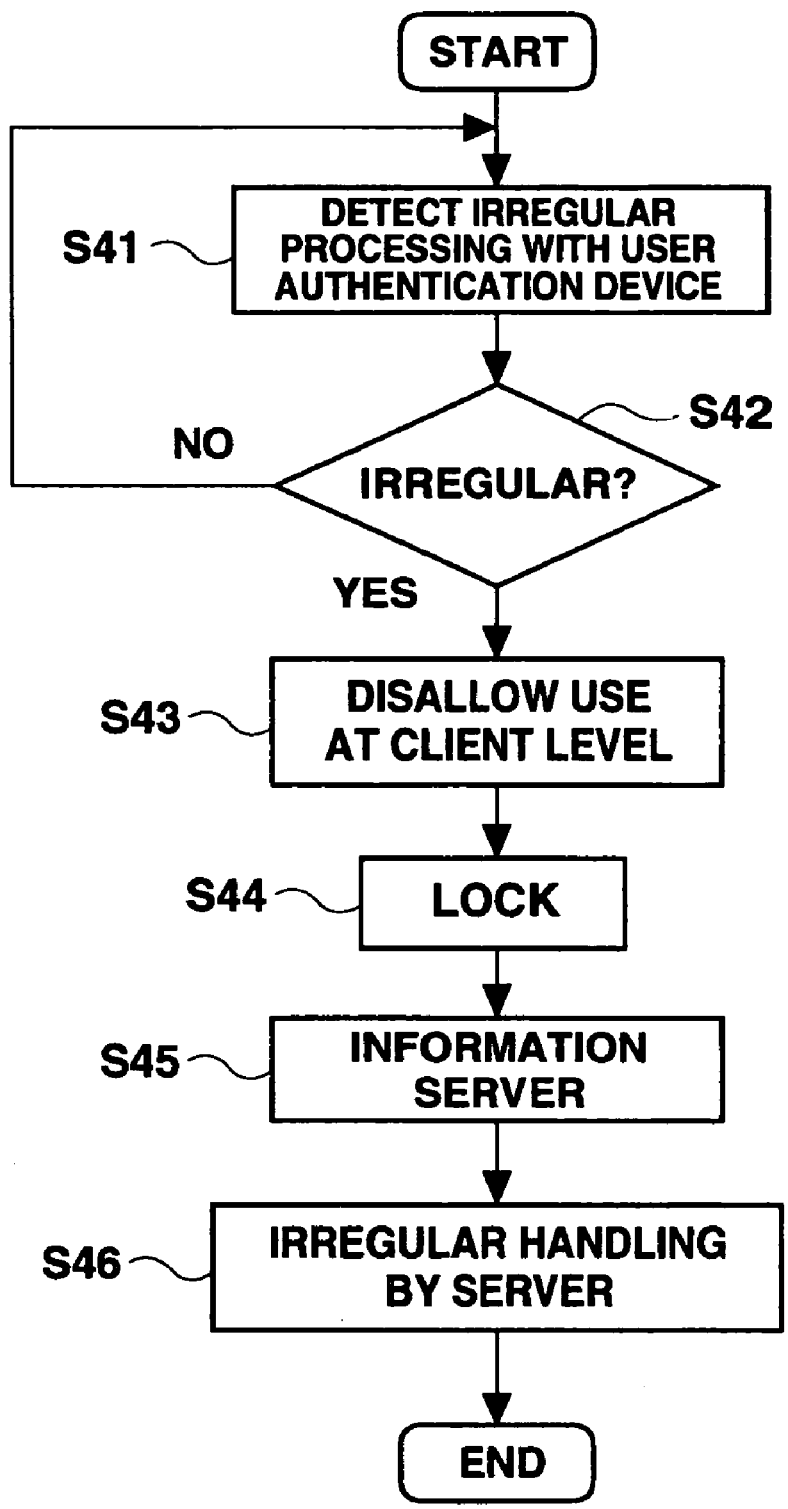
FIG. 16 is a flowchart of processing for user authorization system.

At step S41 in FIG. 16, an automobile user inputs motion information via the authentication information input means 10 when wishing to use the automobile. The authentication information comparison means 12 compares the input motion information and the initial registration pattern (initial motion information) registered in the authentication information storage means 11 to see whether or not they are identical. When it is determined at step S42 that the input information differs from the initial registration pattern (initial motion information) stored in the authentication information storage means 11, the use allowing control means 13 sends a use prohibiting signal to the automobile at step S43, and a signal to lock the door or to prohibit engine start at step S44.

At step. S45, the central control means 16 of the user authentication device sends an irregular signal notifying of dispatch of a use prohibiting signal and an ID number of the associated automobile via the communication means 15, a network, and the server communication means 22. Also, the central control means 16 sends a command to a transmitter/receiver means 14 to direct output of transmission radio waves.

At step S46, receiving the irregular and ID signals, the server applies irregular processing. Specifically, the transmitter/receiver means 21 on the server side receives the radio waves from the transmitter/receiver means 14 via a satellite means to detect location information of the automobile associated with that user authentication device.

With the above, an automobile can be located even if an automobile with locked doors is stolen, and thus can be easily searched for.

It should be noted that, when a specific device is not an automobile, different from the above, the door locking process at step S44 may be substituted accordingly. For example, for calculators, log-in may not be allowed. For an access managing device and so on, doors may be closed. Note that the present invention is not limited to these examples and other processing for prohibiting the use of a specific device may be applicable.

Further, the present invention can be applied to a client device equipped with a user authentication device, such as airplanes, ships, motorcycles, bicycles, rent safes, which are managed by an individual or a corporation.

For a specific device in the form of a calculator, a server may supply a signal for releasing a log-in state via a network even though log-in has failed once.

As is obvious from the above, the present invention offers advantages of input of a 3D coordinate conversion parameter obtained from a monochrome image captured via one camera, and of modification of a model according to the input parameter.

Specifically, a special coordinate input device or equipment is unnecessary to input motion information because a tracking reference point is automatically determined through detection of an index finger and a thumb in an input image.

Further, illegal use of a specific device can be prevented through detection of an irregular state upon detection of a different pattern through comparison between motion information input when a user desires to use the specific device, and a pre-registered initial registration pattern (initial motion information).

Instead of initial motion information used as initial registration pattern in this embodiment, other known initial registration patterns, including the iris, finger prints, and audio number information, may be used for authentication of a specific device.

Figure 17:
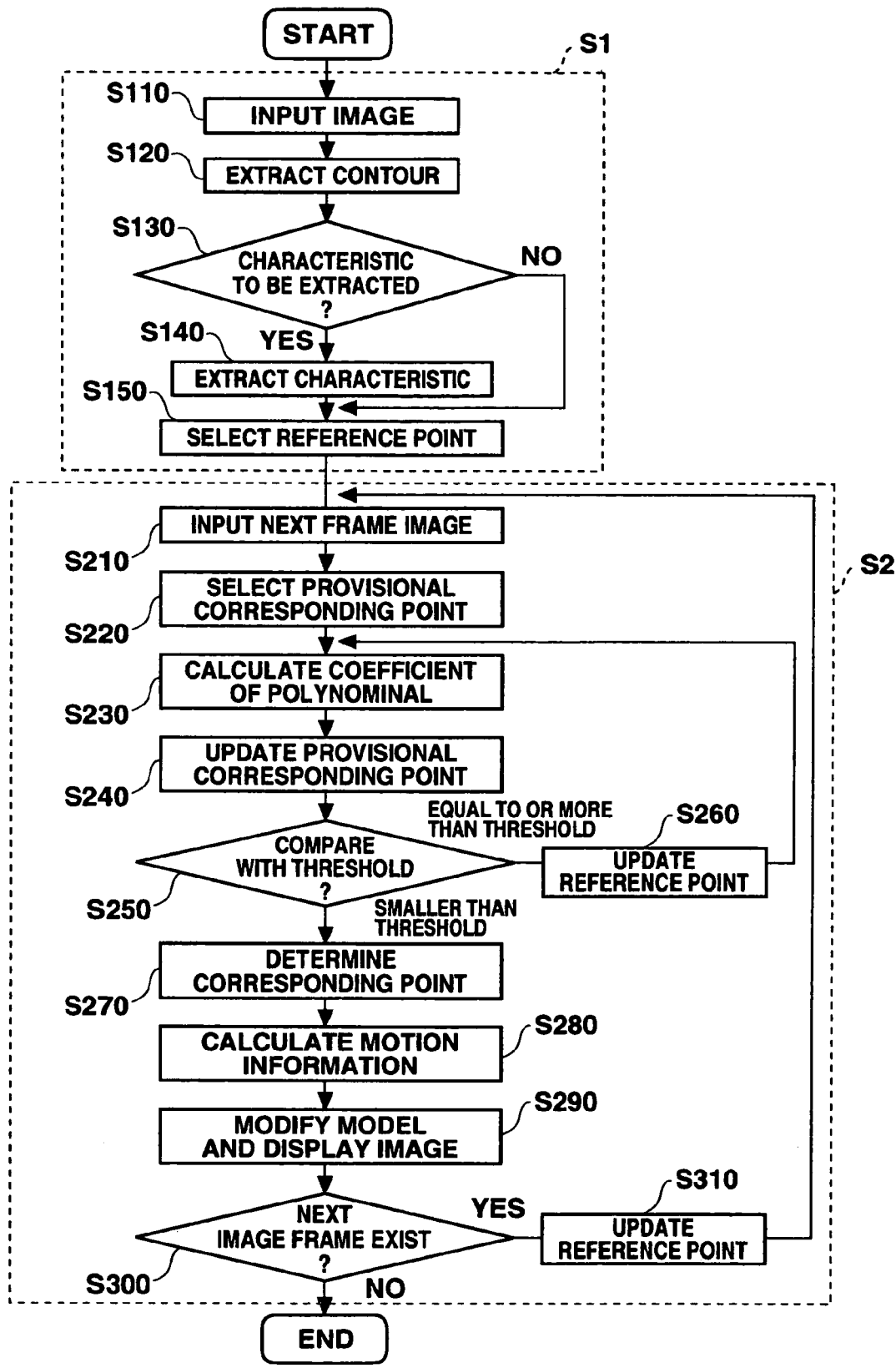
FIG. 17 is a flowchart of motion image processing in another preferred embodiment.

FIG. 17 is a flowchart showing a process procedure for a motion image processing method in another preferred embodiment of the present invention, which corresponds to modification of the process in FIG. 7 in the above embodiment.

As shown, the method of this embodiment consists of processing for an initial image frame (S1) and that for subsequent image frames (S2). Each processing will be described below.

I. Processing Using Initial Image Frame (S1)

In this preferred embodiment, at step S110, an object, or a finger, is shot beforehand using a image capturing means 1, whereby contour information of the finger is obtained at step S120 (S120).

At step S130, whether to apply characteristic extraction at step S140 or to skip step S140 is determined in selecting a reference point from points on the contour for object tracking (S130). In the following, characteristic extraction processing at step S140 to be applied when it is determined to be necessary at step S130 will be described.

Ia. Normal Directions at Points on Contour to be Considered

At step S140, normal directions are calculated as for the respective points extracted at step S120 on the object contour, using information on a contour nearby (S140). At step S150, reference points are selected from points on the contour in consideration of the normal directions (S150), specifically, such that normal directions thereof may vary in two or more directions, rather than deviating in one particular direction, and that an angular difference about 90° may be formed between each of the normal directions. In this embodiment, twenty reference points are selected, and a reference point angle is set at about 90°, which, however, is not a limiting example. Instead, a reference point angle may be determined desirably in a range between 45° and 135°, or even 80° and 100°.

Ib. Basic Shape Characteristic of Contour to be Considered

At step S140, characteristic points are detected from among respective points extracted at step S120 on an object contour, and divided into a straight line segment and a curve segment. Further, the contour shape is extracted as a shape characteristic, based on a description expressed through combination of these segments (S140). Further, at step S150, a reference point is determined for tracking the object, based on the extracted shape characteristic (S150).

II. Processing for Subsequent Image Frames (S2)

At step S2, the reference point obtained at step S1 is tracked in subsequent image frames. The processing here includes reference point tracking (S210 to S270), motion information calculation (S280), and model modification and image display (S290).

IIa. Reference Point Tracking (S210 to S270)

In this embodiment, it is assumed that a relationship between a reference point and its corresponding point can be expressed by means of Affine conversion. At steps S210 to S270, a plurality of (for example, at least four) reference points on the same plane in a 3D space are selected from those selected at step S150 in the initial frame, and how the selected reference points move to the respective corresponding points in a different frame, in other words, in a predetermined time, is detected.

It should be noted that the fact that two plane patterns obtained by projecting a point on a plane in a 3D space into two different planes (e.g., an image projection plane, and so on) hold a relationship adaptable to Affine conversion, can be utilized. In actual fact, when motion of a finger is limited to translation and rotation on a desired plane in a 3D space, with respect to a display object of an image obtained by photographing an object, a relationship between corresponding points in images in different frames can be, expressed by means of Affine conversion. Specifically, reference points may be tracked in the same manner as described in the above embodiment.

Finally, at step S300, when next image frame remains, the corresponding point obtained at step S270 is used as a reference point in the next image frame (S310). Accordingly, motion of an object can be tracked based on a coordinate conversion parameter, as obtained above, from "a reference point" to "a corresponding point".

IIb. Motion Information Calculation (S280)

At step S280 in FIG. 17, motion information of a plane pattern is calculated based on a relationship between coordinates of a reference point in an initial frame and those of its corresponding point in a frame at a different time, tracked at step S270, and also on an assumption of limited motion (an assumption such that an object be within a view field and be reliably photographed even for a frame at a different time) for a plane in a 3D space. Here, by imparting a focal length of a lens of an image capturing system, motion information can be obtained, including translation 3 freedom, rotation 3 freedom, a normal direction of the plane, and a distance from the origin of a coordinate system to the foot of perpendicular on the plane.

It should be noted that, because a translation vector is obtained as a ratio relative to the distance, the distance must be obtained in any method in order to calculate an accurate motion amount, though any value may be used as the distance for relative motion calculation.

IIc. Model Modification and Image Display (S290)

At step S290 in FIG. 17, a display object, such as a model or a pointer, provided beforehand in a calculator, is subjected to coordinate conversion, based on motion information calculated at step S280, whereby the display object is modified according to the motion of the object, supplied as an input image. Specifically, a 3D model within the calculator may be moved or rotated for modification or a cursor may be moved and so on according to the motion of a finger.

Also in this embodiment, on-line shopping using a solid model in a virtual environment such as a virtual mall, or operation of a game character in the field of amusements, can be performed.

What is claimed is:

1. A motion image processing method comprising:
extracting a shape characteristic of an object contained in time series images by processing an initial frame of the time series images, wherein extracting the shape characteristic includes extracting a contour based on edge information of an input image of the object, detecting characteristic points consisting of a bending point, which is a point with a quick change of an edge gradient direction based on edge information, a curving point, which is a point on a contour with inversion of a curvature sign and a moderate change of an edge gradient direction, and a transition point, which is a point on a contour with a change of a curvature from zero to another value, or vice versa, and a moderate change of the edge gradient direction, dividing the contour into a straight line segment and a concave or convex curve segment based on the characteristic points, and combining segments obtained in the same frame, whereby a specific portion is detected in the image obtained by projecting the object;
detecting, using the shape characteristic, reference points on a same plane in a 3D space for tracking motion, in an image in the initial frame, and a point corresponding to each of the reference points in a frame different in time from the initial frame to be tracked;

tracking the reference points over time to calculate motion information of the object in the 3D space, wherein motion information of the plane in the 3D space is calculated, based on at least four reference points for tracking and corresponding points obtained in a plurality of time series frames, and also on an assumption of limited motion for a plane in a 3D space such that pairs of reference points and corresponding points are located on the same plane in the 3D space; and modifying a display object including a model or a pointer provided beforehand, based on the motion information.

2. A motion image processing method according to claim 1, wherein at least one of the reference points for tracking is determined on a contour of the specific portion detected in the image obtained by projecting the object.

3. A motion image processing method according to claim 1, wherein a shape characteristic of the contour of the object is expressed using a plurality of segments defined by characteristic points.

4. A motion image processing method according to claim 1, wherein at least one of the reference points for tracking a corresponding point is determined on the segment.

5. A motion image processing device comprising:

means for extracting shape characteristics of an object contained in time series images by processing an initial frame of the time series images, wherein the means for extracting shape characteristics extracts a contour based on edge information of an input image of the object, detects characteristic points consisting of a bending point, which is a point with a quick change of an edge gradient direction based on edge information, a curving point, which is a point on a contour with inversion of a curvature sign and a moderate change of the edge gradient direction, and a transition point, which is a point on a contour with a change of a curvature from zero to another value, or vice versa, and a moderate change of an edge gradient direction, divides the contour into a straight line segment and a concave or convex curve segment based on a characteristic point, and combines segments obtained in the same frame, whereby a specific portion is detected in the image obtained by projecting the object;

means for detecting a reference point in the frame, using the shape characteristics;

means for tracking the reference point over time to calculate motion information of the object in a 3D space; and means for modifying a display object including a model or a pointer, provided beforehand, based on the motion information, wherein motion information of a plane in the 3D space is calculated, based on a plurality of reference points for tracking and corresponding points obtained in a plurality of time series frames, and also on an assumption of limited motion for a plane in a 3D space such that pairs of the reference points and corresponding points are located on the plane in the 3D space.

6. A motion image processing device according to claim 5, wherein at least one of the reference points for tracking is determined on a contour of the specific portion detected in the image obtained by projecting the object.

7. A motion image processing device according to claim 5, wherein a shape characteristic of the contour of the object is expressed using a plurality of segments defined by characteristic points.

8. A motion image processing device according to claim 5, wherein at least one of the reference points for tracking a corresponding point is determined on the segment.

9. A motion image processing device according to claim 5, wherein at least four points on a same plane in a 3D space are selected, as reference points for tracking motion, in an image in an initial frame, and a corresponding point corresponding to each of the reference points is detected in a frame different in time from the initial frame to be tracked.

10. A computer-readable medium storing a program which when executed by a computer performs:

extracting a shape characteristic of an object contained in time series images by processing an initial frame of the time series images, wherein extracting the shape characteristic includes extracting a contour based on edge information of an input image of the object, detecting characteristic points consisting of a bending point, which is a point with a quick change of an edge gradient direction based on edge information, a curving point, which is a point on a contour with inversion of a curvature sign and a moderate change of the edge gradient direction, and a transition point, which is a point on a contour with a change of a curvature from zero to other value, or vice versa, and a moderate change of an edge gradient direction, dividing the contour into a straight line segment and a concave or convex curve segment based on the characteristic points, and combining segments obtained in same frame, whereby a specific portion is detected in the projected image of the object;

detecting, using the shape characteristic, reference points on a same plane in a 3D space for tracking motion, in an image in the initial frame, and a point corresponding to each of the reference points is detected in a frame different in time from the initial frame to be tracked;

tracking the reference point over time to calculate the motion information of the object in the 3D space, wherein motion information of the plane in the 3D space is calculated, based on at least four reference points for tracking and corresponding points obtained in a plurality of time series frames, and also on an assumption of limited motion for a plane in a 3D space such that pairs of reference points and corresponding points are located on the same plane in the 3D space; and modifying a display object including a model or a pointer provided beforehand, based on the motion information.

11. A medium according to claim 10, wherein at least one of the reference points for tracking is determined on a contour of the specific portion detected in the image obtained by projecting the object.

12. A medium according to claim 10, wherein a shape characteristic of the contour of the object is expressed using a plurality of segments defined by characteristic points.

13. A medium according to claim 10, wherein at least one of the reference points for tracking a corresponding points is determined on the segment.

* * * * *